Figure 15:
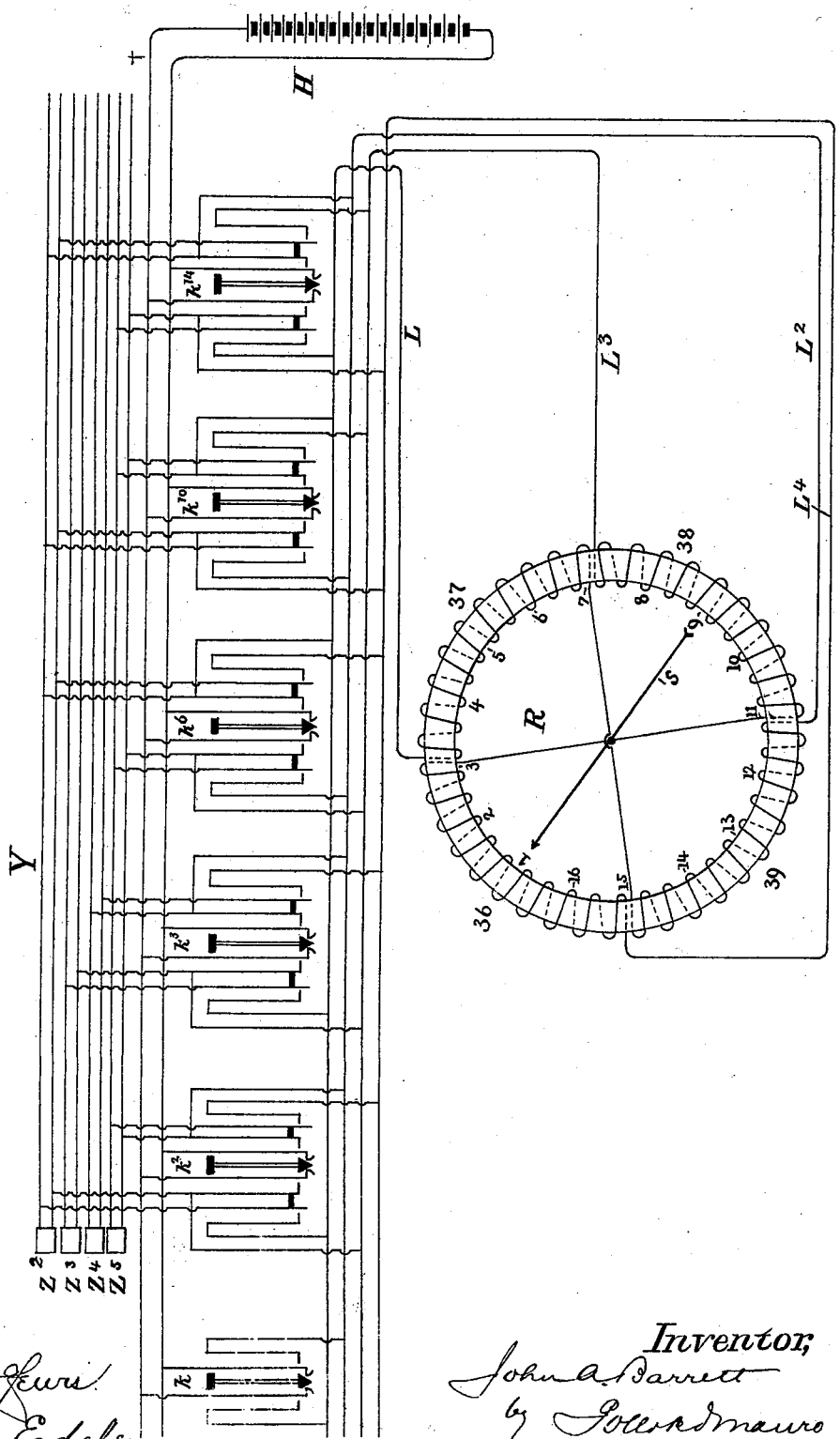

(No Model.) 4 Sheets—Sheet 1.
J. A. BARRETT.
TELEPHONIC SELECTIVE SIGNALING.
No. 594,979. Patented Dec. 7, 1897.
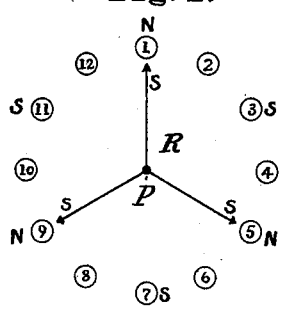
Fig. 4.
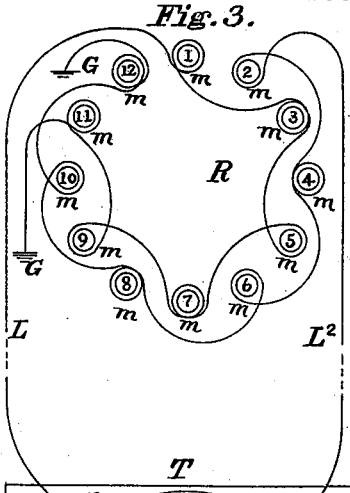
Fig. 3.
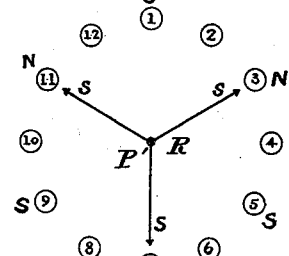
Fig. 6.
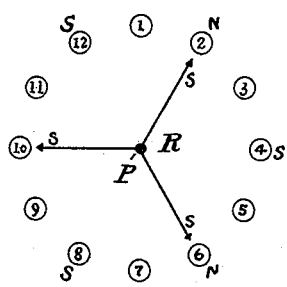
Fig. 5.
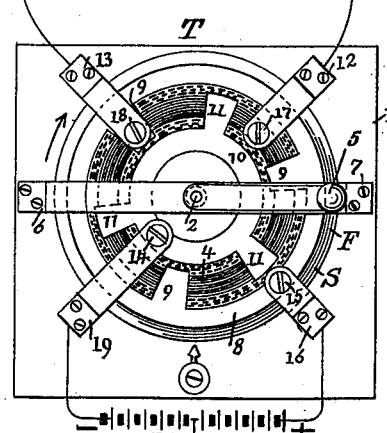
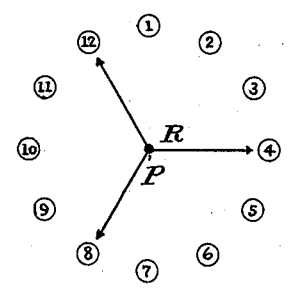
Fig. 7.
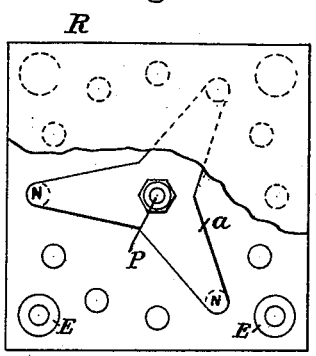
Fig. 1.
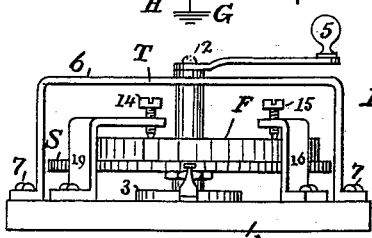
Fig. 3ᵃ.
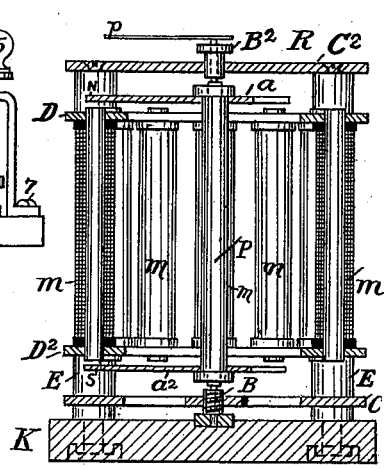
Fig. 2.
Attest,
Henry Lewis
W. R. Edelen.
Inventor:
John A. Barrett
by Pollok & Mauro,
his attorneys.
THE NORRIS PETERS CO., PHOTO-LITHO., WASHINGTON, D. C.

(No Model.) 4 Sheets—Sheet 2.
J. A. BARRETT.
TELEPHONIC SELECTIVE SIGNALING.
No. 594,979. Patented Dec. 7, 1897.
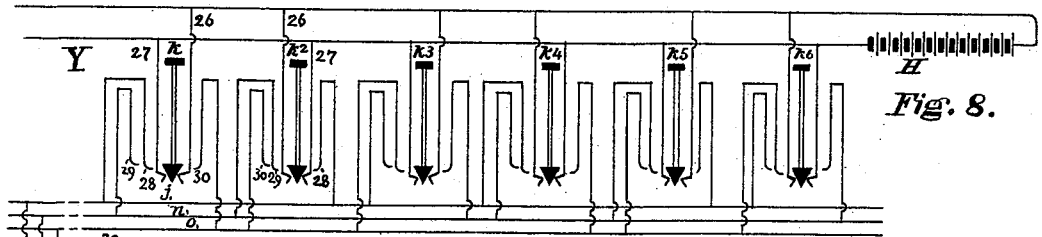
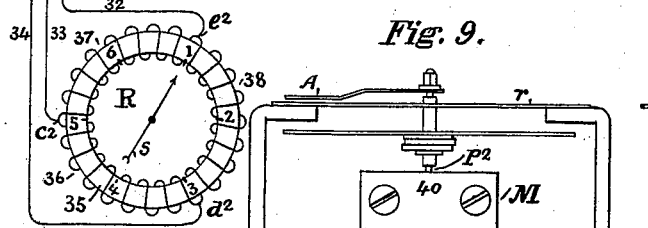
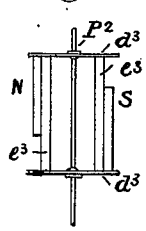
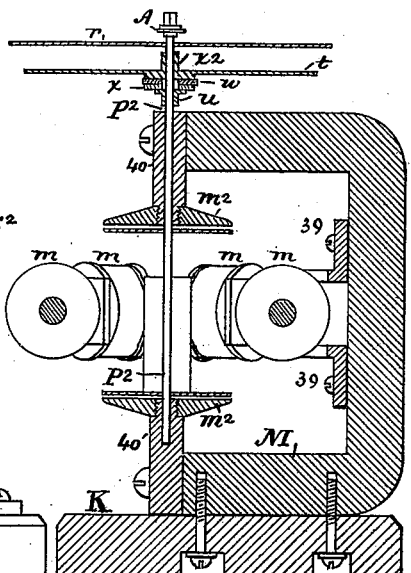
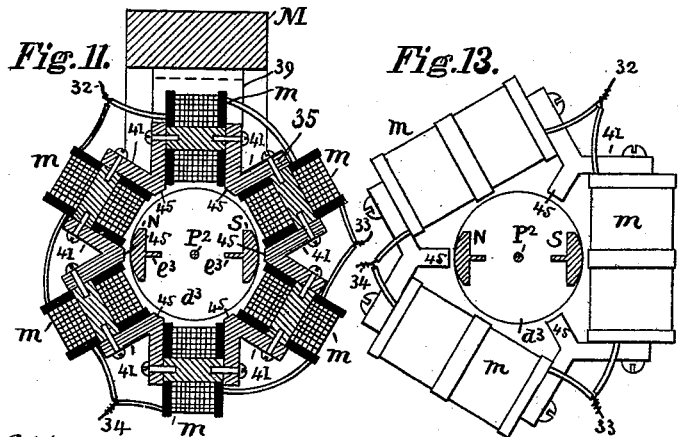
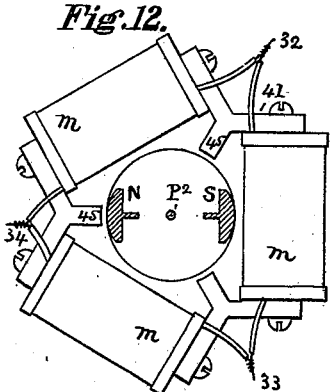
Attest,
Inventor,
John A. Barrett (No Model.) 4 Sheets—Sheet 3.

J. A. BARRETT.
TELEPHONIC SELECTIVE SIGNALING.

No. 594,979. Patented Dec. 7, 1897.

Attest,
Inventor,
John A. Barrett (No Model.) 4 Sheets—Sheet 4.

J. A. BARRETT.
TELEPHONIC SELECTIVE SIGNALING.

No. 594,979. Patented Dec. 7, 1897.

Attest, Inventor,
John A. Barrett
W. R. Edelen. his attorneys

UNITED STATES PATENT OFFICE.

JOHN A. BARRETT, OF BROOKLYN, NEW YORK, ASSIGNOR TO THE AMERICAN TELEPHONE AND TELEGRAPH COMPANY, OF NEW YORK.

TELEPHONIC SELECTIVE SIGNALING.

SPECIFICATION forming part of Letters Patent No. 594,979, dated December 7, 1897.

Application filed March 1, 1897. Serial No. 625,639. (No model.)

*To all whom it may concern:*

Be it known that I, JOHN A. BARRETT, residing at Brooklyn, in the county of Kings and State of New York, have invented certain Improvements in Telephonic Selective Signaling, of which the following is a specification.

This invention concerns the art of electric signaling, and while capable of a variety of applications is particularly adapted to that branch of such art which has appropriately been entitled "selective" signaling, wherein any one of a number of substations connected with a single main electric circuit may, when desired, be signaled from a central station to the exclusion of the others, and which likewise comprehends any system wherein any desired one of a number of independent signals at one or more stations may be selected and operated from another station, the others during such operation remaining quiescent.

One of its prime objects, therefore, is to provide a selective-signaling system and apparatus which, involving no ratchet and pawl, harmonic, clockwork, or other intricate mechanism, shall as a whole be characterized by simplicity of plan and structure, and which shall be easily and speedily operated, perfectly efficient in operation, and absolutely trustworthy in result.

The invention partly consists in an electromotor having movable and fixed elements constituting, respectively, field-of-force and armature magnets and so organized and constructed that it is capable of responding to appropriate action taken at a distant point in the circuit with which it is associated in such wise that the movable element may be caused to rotate on its axis in the presence of the fixed element and thus to move from its normal or resting position and into any one of a series of different and definite positions either progressively or by a single motion or impulse. Each of these positions has a certain definite signification possessed by none of the other positions, and where but one such motor is connected with the circuit it may thus be enabled to indicate a plurality of different signals, while if a number of such electromotors be placed on the same circuit or combination of conductors the movable parts may be adapted to serve as switches or circuit-changers and at operative positions differing for each station to bring an alarm or signal into operation.

The invention also comprises transmitting or manipulating appliances at a central or main station, receiving or manifesting appliances at one or at each one of a number of substations, and two or more main conductors extending between the main station and the sub-station or stations.

Broadly stated, the transmitting appliances at the main station comprehend a suitable source of electrical currents and means for transmitting currents of either direction developed by said source—that is to say, currents of either plus or minus sign in different combinations over one or more of the main conductors by a single operation. The said means may assume the form of a suitable permutator actuated by a handle or otherwise and capable of being turned successively to a number of different positions, and of establishing at each some one definite combination of currents and conductors, or may consist of a bank of keys and buttons, each key controlling a particular and definite association of the source of current and its poles with the main conductors, and consequently controlling also a particular and definite combination of conductors and currents.

In some cases, where for the multiplication of distinct selective signals it becomes desirable to utilize currents of different strengths, thus bringing about an increase in the number of possible current combinations, I associate suitable resistances with some of the combination controlling-keys.

The signal-receiving appliances are also susceptible of considerable variety of form, the particular form employed in any given instance being to some extent dependent upon the form of the transmitting apparatus. Where the rotary permutator is employed, it may take the form of an electromotor having a permanent magnet rotary field-of-force and a number of fixed electromagnet armatures and provided with devices for manifesting the received signals. In this case the rotary field will progress from one set of armatures to a second, and so on, in exact correspondence with the movements of the central-station permutator, and in effect constitutes a kind of electromagnetic step-by-step system which, however, is not trammeled by ratchet-and-pawl mechanisms.

When the keyboard system of transmitting instruments is employed, the receiving appliance is likewise a motor which, while based on the same principles as the foregoing, is freed from the limitations of progressive motion, the active element of the appliance moving at once and by a single impulse to the definite position required to give at any station the desired signal. When the rotary-field element reaches such position, it may of course be made useful for any desired purpose—for example, the production of a visible signal or the closing of a local circuit to ring a bell contained therein.

In the former plan of construction two main conductors will usually be found sufficient, while in the latter plan three are preferably employed, or, in a manner well understood, two combined with the earth.

As will presently be indicated, a greater number of main conductors may under certain conditions be utilized to increase the number of available, distinct, and determinate signals.

Figure 17:
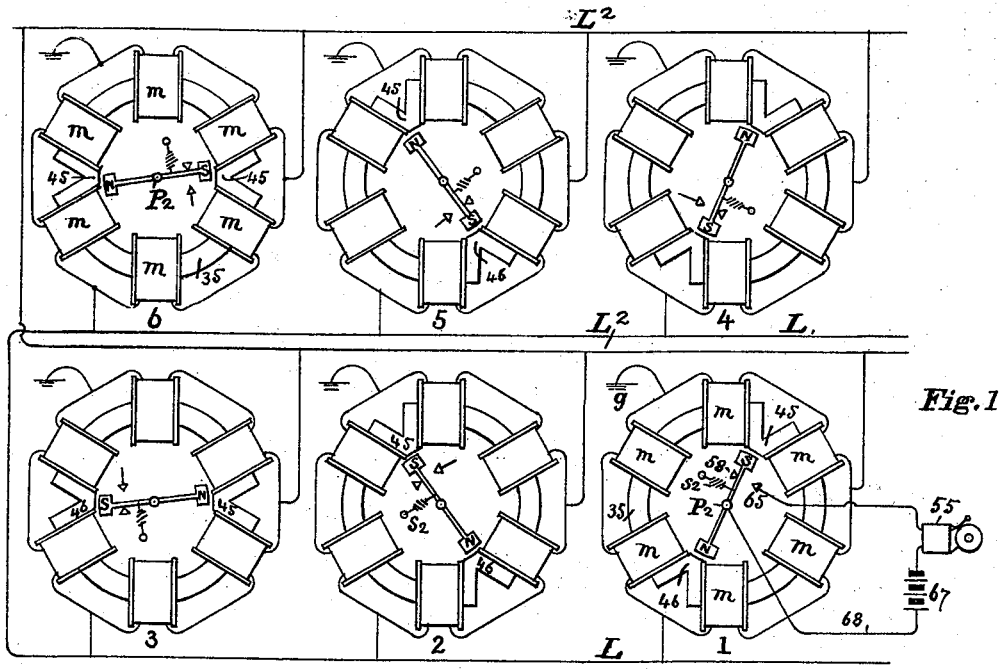
Figure 16:
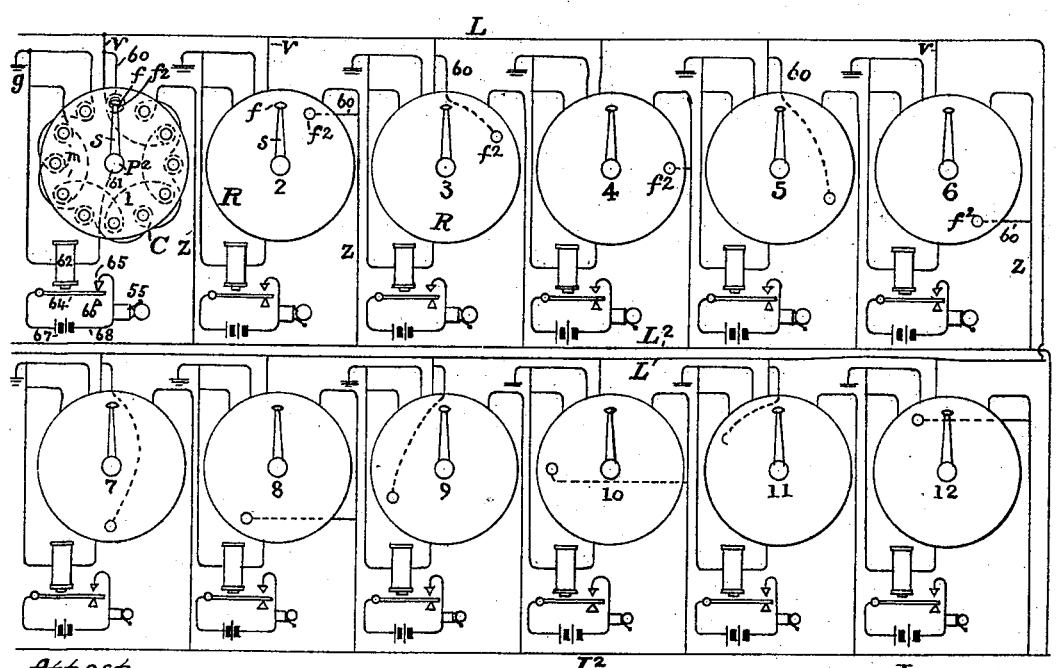

In the drawings which illustrate the invention, Figures 1 and 2 are respectively a plan and a sectional view of the first form of a selective electromagnetic motor; Fig. 3, a diagram of the same selective motor in circuit with a suitable signal-transmitter therefor and a source of current. Fig. 3ª is a side view of the transmitter shown in Fig. 3. Figs. 4, 5, 6, and 7 are diagrams illustrative of the progressive rotation of the selective motor caused by the commutation of currents at the sending-station. Fig. 8 is a diagram of the second form of motor-selector and its transmitting devices, the latter consisting of a series of press keys or buttons and the former of a series of coils on a closed core forming closed magnetic and electric circuits in inductive relation to a rotary-field magnet; and Figs. 9, 10, and 11 are respectively an elevation, a cross-section, and a longitudinal section of such a motor-selector. Figs. 12 and 13 are modifications of the same. Fig. 14 is a side view of the rotating magnet detached. Fig. 15 is a modification indicative of the expansibility of the motor system, and Figs. 16 and 17 are diagrams to illustrate the applicability of my motor system to selective signaling on telegraphic or telephonic circuits.

In describing this invention it is convenient to consider, first, the arrangement of transmitting and receiving appliances and circuits illustrated by Figs. 1 to 7. The receiving instrument is the principal factor, since I am not restricted to the specific form of transmitter shown. The receiving-motor illustrated by these figures comprises a permanent magnet rotary field and a suitable number—in this instance, twelve—fixed electromagnets collectively constituting a fixed compound armature. A vertical central shaft, of magnetized steel, having a three-rayed steel plate secured at each of its two ends, is supported in bearings, so as to turn freely, and forms the rotary field of which the three rays of one of the plates are north poles, while the three rays of the other plate are south poles. The twelve-bar electromagnets are rigidly supported in a circle concentric with the shaft, so that their ends lie within the circles described by the rays of the rotary poles of the field-magnet, the length of the magnet-bars being such as to allow the said ray-poles at both ends to pass over them without touching. The three north poles at one end and the three south poles at the other end thus overlap opposite ends of three of the electromagnet-cores, and it is evident that in this situation the said cores when not acted on by an electric current flowing in their coils and also when acted upon by a certain definite current in their coils serve as keepers to the rotary-field magnet and hold it fixed in a definite position with considerable firmness. Since there are twelve cores, there are twelve such definite positions. The armature-windings consist of a single spool of wire on each core. There are two main circuit-conductors, and the connections of these with the said armature-windings are such that the circuit of one of the said conductors includes six of the electromagnet-spools taken alternately and that the circuit of the other includes the remaining six spools, each spool of one circuit-conductor being thus placed between two of the other conductors. In each of the two series of spools the direction of the circuit round the core is reversed in every alternate spool, as will presently be shown more in detail. With a source of electricity and circuit-breaking and pole-changing switches in the circuit-conductors various definite phases of attraction and repulsion can be produced between the electromagnetic poles and the armatures. This motor-receiving instrument is organized to be actuated by electrical-current impulses of alternate plus and minus direction transmitted over the two conductors alternately or successively, and as there are two directions of current and two main conductors it is apparent that four distinct impulses can be transmitted, which will advance the field-magnet into its fourth position, and that the same series of impulses repeated twice will carry the said magnet by progressive steps to the twelfth position, which is the original one. The requisite impulses can of course be readily transmitted from a single battery or other source of current by two keys controlling the two poles of said source or by a key or keys controlling two batteries with opposed line and earth poles; but I find it convenient to employ a rotary transmitting apparatus adapted to move contact-plates representing the plus and minus poles of the generator or generators into contact with the terminals of the two line conductors successively and alternately.

In the figures of the drawings mentioned, R is the selective receiving-motor. P is its magnetized-steel shaft or spindle; $a\ a^2$, triangular polar extensions thereof, the north poles being assumed to be at the upper and the south poles at the lower end of the shaft, these together forming the rotary field.

$m$, with the index-numbers 1 2 3, &c., indicates the electrobar-magnets, which form the fixed armature.

T is the transmitting-permutator, and H a current-generator, both placed at a main or central station, and L and $L^2$ are the two main conductors extending from the said main station (where their ends, through the operation of the permutator, connect with the generator-poles) to the substation, where their outer ends connect with the armature-helices of the receiving-motor R. The said motor R has a non-conducting base K, to which are secured the pillars E, supporting the plates C and $C^2$, in which are formed the step B and bearing $B^2$ of the shaft P, which at its extreme upper end is fitted with an index finger or pointer $p$, adapted to move over the upper surface of the plate $C^2$ and indicate on a circular scale on the face of said plate the point to which it has been advanced. Rings or annular plates D $D^2$ are also supported by the said pillars and hold the electromagnets $m$ in place. The three-rayed pole-pieces $a\ a^2$ are formed as shown in Fig. 1, and the electromagnets $m$ are arranged in a circle, (whose radius is substantially equal to the distance between the center of the said pole-pieces and the ends of their rays) with their opposite ends projecting from the faces of their supporting-rings D.

As Fig. 3 clearly shows, one of the line conductors L contains the helices of six of the electromagnets 1 3 5 7 9 11, and the other main conductor $L^2$ includes the remaining six 2 4 6 8 10 12, and after passing these serially the said conductors connect with a return-conductor, (shown as the earth,) G. It is, however, to be observed that for each conductor the spools of the immediately-succeeding electromagnet are always wound or connected oppositely to that of its neighbor on either side. Thus while magnet 1 is so wound that a positive current in conductor L, passing round its upper end, will create a north pole therein, and also in the upper ends of 5 and 9, the same current will develop south polarity in the upper ends of magnets 3, 7, and 11, and if a positive current be sent over conductor $L^2$ a south pole will be developed in the upper ends of magnets 2, 6, and 10 and a north pole in 4, 8, and 12.

The permutating apparatus T, which I have arranged to serve as a transmitter, is shown in Figs. 3 and $3^a$. Its construction is as follows:

On a non-conducting base 1 a supporting-bridge 6 is secured by the screws 7.

F is a permutating-plate or the movable part of the appliance provided with a spindle 2, which is stepped in the plate 3 at its lower end, has at its upper end a bearing in the bridge 6, and is fitted with a crank or handle 5, whereby it may be turned. The permutating-surface F has a sole-plate S, of non-conducting material, bearing on its upper side the metal ring plate 8, provided with the inwardly-projecting contact-surfaces 9, and also an inner conducting-plate 10 with outwardly-projecting conducting-surfaces 11, which are insulated from 8 and its projections by the intervening non-conducting plates or partitions 4.

The double battery H has a ground connection G at its center, and its opposite poles are in permanent connection with the ring plates 8 and 10, respectively, by means of the terminal plates 16 and 19 and the contact-screws 14 and 15, which latter rest one on the plate 10 and the other on the plate 8. Similar plates 12 and 13 form the main-station terminals of the line conductors L $L^2$ and have contact-screws 17 18, which come into contact with the projections 9 and 11 of the ring plates 8 and 10 or with the interposed insulating-surfaces, as the case may be, when the permutating-plate is turned by the handle 5. Thus in the position shown a plus current proceeds from the right-hand section of the battery by plate 16, screw 15, ring plate 8, projection 9, screw 18, and plate 13 to line conductor L and through the coils 1, 3, 5, 7, 9, and 11 of the magnets $m$, while, supposing the transmitter to be moved one step forward until screw 17 rests over projection 11, a minus current will pass over $L^2$ by way of plate 19, screw 14, ring plate 10, projection 11, contact-screw 17, and plate 12 and will vitalize the cores of magnets $m$, 2, 4, 6, 8, and 12. A third step sends a minus current over L and a fourth a plus current over $L^2$, after which the same cycle of four begins once more.

Figs. 4, 5, 6, and 7 indicate four of the positions or phases which can be successfully assumed by the rotary field under the influence of the two oppositely-directed currents when transmitted over the two line conductors one at a time, the three radiating arrows indicating the lower or south poles of the triple-ray pole-pieces $a^2$. Considering the first "phase"—that represented by Fig. 4—the permutator is so placed that a plus current is supposed to be passing in line L and no current or zero in line $L^2$. This, as we have seen, will develop north polarity in electromagnet-cores 1, 5, and 9, attracting the field-poles S S S, and south polarity in the cores 3, 7, and 11, repelling the said field-poles. There will be no active polarity in the group of armature-magnet cores belonging to line $L^2$—that is, those designated by even numbers. Under these conditions the field-magnet necessarily assumes the position desired, and if the current be now withdrawn from the circuit of conductor L the field-magnet will retain its position in virtue of its inductive attraction exercised upon the soft-iron cores nearest to its poles. Let the permutating-transmitter T be advanced one step, bringing terminal screw 18 of line L to a non-conducting surface and terminal screw 17 of $L^2$ into contact with one of the projections 11 of the inner ring plate 10. A minus current now passes over $L^2$, and there is no current in L. Accordingly the armature-poles 2, 6, and 10 become north and poles 4, 8, and 12 become south, while all the odd-numbered poles become neutral. The result is that depicted in Fig. 5, where the field has been impelled by the attraction into the position opposite electromagnets 2, 6, and 10. Continuing to turn the transmitting-permutator the third phase, Fig. 6, is produced by the minus current in circuit L, with no current in circuit $L^2$, and the fourth phase is produced by a plus current in circuit $L^2$, with no current in circuit L, as illustrated by Fig. 7. Of course the attracting and repelling actions are duplicated at the opposite end of the motor, of which one end only is shown in Figs. 3, 4, 5, 6, and 7, except that the respective polarities are interchanged. In this case there are four arrangements of current: first, plus in circuit L; second, minus in circuit $L^2$; third, minus in circuit L, and, fourth, plus in circuit $L^2$. Three applications of these four currents in the order named produce a complete revolution of the armature P always in the right-hand direction, encompassing twelve possible stopping-points. If the order of succession in the changes is reversed, the direction of the movement of the armature is reversed. Consequently the rotary-field magnet can readily be controlled both in its direction of movement and its positions of rest.

Employing such a transmitter as T, coupled, as shown and described, with the current-generator and rotary selective motor, the indicating-pointer of the latter within limits of considerable width as to rate of transmission and strength of current follows exactly all the movements and stops of the transmitter-handle, the movement of the motor being quite independent of any necessity of exactitude or uniformity in the rate of transmission. It has been hereinbefore observed, however, that the action of this combination of devices is progressive from stage to stage of its movement, and it is evident that to advance the rotary field from one definite position to another all the intermediate changes of current must be applied in order.

It is frequently desirable to employ a selective motor with a rotary field and stationary armature in which the said field-magnet is capable of moving directly to any required definite position in the circle of revolution, corresponding with a prescribed definite combination of circuit and current without being dependent upon progressive propulsion or propulsion by successive impulses produced by the transmission of intermediate current permutations. The devices illustrated by Figs. 8, 9, 10, 11, 12, 13, and 14 furnish such desired means for carrying out the invention.

The current permutating-transmitter is shown at Y in Fig. 8, and consists of a number of press keys or buttons $k$, each comprising two contact-springs 26 and 27, constituting the terminals of the poles of battery H and arranged to connect the said poles by means of contact-springs 28, 29, and 30, conductors $j\ n\ o$, and wires 32 33 34 with the windings 36, 37, and 38 of the selective motor R, so as to transmit severally certain combinations of current from the battery to and through the said windings. The wire is wound upon the iron ring 35 in a continuous closed circuit, from which the taps or branches 32, 33, and 34 are led out at the three equidistant points $e^2\ c^2\ d^2$. By depressing key $k$ connection from $e^2$ is made with the positive end of the battery and from $c^2$ and $d^2$ with the negative end of the battery, and current will flow equally through the field-winding from $e^2$ to $c^2$ and from $e^2$ to $d^2$. This will produce a south pole in the iron ring at $e^2$ and a north pole at a point 4, diametrically opposite to 1 and midway between $c^2$ and $d^2$. In consequence of the formation of these two opposite poles a polarized field-magnet bar or needle $s$, pivoted at the center of the ring, will be drawn into position with its north pole at 1 and its south pole at 4. If key $k^4$ is depressed, point $e^2$ is connected to the negative and $c^2$ and $d^2$ to the positive end of the battery, and the location of the poles in the ring remains the same as before; but the pole at 1 is now north and the pole at 4 is now south. Consequently the position of the movable needle $s$ will be exactly reversed. Evidently when any of the keys are operated the needle will move to a corresponding position. Thus there are six definite positions in the revolution of the field, to any of which it may be brought directly and by a single movement by pressing the appropriate key without requiring to be propelled by progressive permutations of current.

To make a practical apparatus for producing the polar attractions and repulsions more vigorously and decisively, as well as to enable the windings to be applied on straight spools, which is highly convenient in construction, the arrangements of motor shown in Figs. 9, 10, 11, 12, 13, and 14 have been devised.

In Figs. 9, 10, and 11, K is a non-conducting base supporting a horseshoe permanent magnet M, provided with polar extensions 40, extending inwardly and toward one another, which terminate in broad circular buttons $m^2$. A small brass shaft $P^2$ is stepped in the lower extension 40 and has a bearing in the upper one, through which it extends for the attachment of certain parts. Two thin disks of steel $d^3$ are firmly attached to the shaft $P^2$, which also supports a pair of bars N and S, forming the rotary-field poles, N being secured magnetically to the upper disk and S to the lower. The lower end of the pole-piece N, which is attached to the upper steel disk, extends downwardly toward the lower disk, but is separated therefrom by a considerable space, and in the same way the upper end of the pole-piece S extends toward the upper disk, from which it is separated by a like space. The steel disks are so placed on the shaft that the upper one is near to the flat face $m^2$ of the upper polar extension 40 and parallel with it, but separated from it by a narrow air-space, the lower disk sustaining the same relation to the flat face $m^2$ of the lower polar extension. Thus placed they are equally subject to the inductive influence of the large magnet M in all stages of the revolution of the shaft $P^2$ without mechanically impeding its movement. Two braces $e^3$, of brass, hold the disks $d^3$ together, being placed one on each side of the shaft, and to these also the steel pole-pieces N S are secured.

The entire arrangement of the shaft, disks, poles, and braces constituting the movable part of the motor is best shown by Fig. 14. The downward extension of pole-piece N and the upward extension of pole-piece S are sufficient to overlap the exposed polar faces of the core of the armature-ring 35, and the exterior faces of the said pole-pieces, as shown in section in Fig. 11, are somewhat rounded. The said ring-armature is composed of six short spools $m$, of wire, wound upon iron cores, which are joined together by six V-shaped pieces of iron 41, the inner ends of which, 45, form the polar faces of the ring. The ring is mounted on the magnet M by means of the brass brackets 39. The windings of the spools are connected in a closed-circuit series, the outside end from one spool to the inside end of the next spool throughout the ring, and at three points 32 33 34 are attached the taps for exterior connections. Two uprights $E^2$, secured to the base K, support the plate $r$ at the top of the motor, which plate bears a scale or any suitable equispaced markings to indicate the nature of the signal transmitted, and the pointer A is fixed to the end of the shaft $P^2$ and moves round with the rotary field over the scale.

To check, dampen, or reduce the oscillation of the rotary armature and to assist it in quickly coming to rest, I provide a device now to be described. $u$ is a collar fastened upon the shaft $P^2$ just above the magnet M. Cemented to the upper surface of the collar is a thin disk of felt $x$. Resting upon the disk $x$ is another felt disk $w$, cemented to the under side of a large metal disk $t$, which has sleeve $x^2$ bearing loosely upon the shaft $P^2$. The inertia of the metal disk $t$ prevents it from following the quick and comparatively strong movements of the shaft, and the friction of the felt disks allows the shaft to slip away from the disk slowly. This device does not affect the principal movements of the rotary field, but, promptly checking its minor oscillatory movements which otherwise would consume much time, enables it quickly to come to rest at any desired point. The action of this selective motor is in substance the same as that illustrated by Fig. 8, which has already been described. The depression of any particular key of the series will cause the index-pointer A to move by one impulse or bound to the corresponding position or number on the scale $r$, and upon releasing the button the rotary field and pointer will retain such position, being held there with some firmness by the inductive attraction between the field-poles and the nearest polar faces of the ring. From such point, however, the moving parts will pass immediately to any other desired point of its revolution upon depressing the appropriate key.

To guard against any possibility of the rotary-field magnet being caught on a dead-center by a close equilibrium of the repelling forces on its two sides as current is introduced into the circuit, the contact-springs in the keys of the transmitting apparatus Y are arranged to apply the battery to one of the two active circuits in the ring a small interval of time before it is applied to the other circuit. By this means the forces in the ring are given a momentary lead in one direction or the other sufficiently to start the armature in the required direction.

Fig. 12 shows a ring constructed for the same system of circuits with windings placed upon but three instead of six straight spools, with the intermediate polar faces omitted. The six positions of the rotary armature are secured, but the opposing attractions of the ring-poles for the armature-poles are not counterbalanced upon opposite sides of the shaft P, and the construction while operative and economical might not be as trustworthy and accurate as is desirable.

In Fig. 13 a ring construction is shown (similar to Fig. 12) which, however, has an iron partition inserted midway of the length of each of the coils $m$, such partitions forming intermediate polar faces, whereby the counterbalanced attractions are effected.

In the apparatus hereinbefore described the number of set positions for the rotary armature is limited to six. The invention is, however, capable of providing a much larger number of field positions where the same is required by circumstances. The diagram Fig. 15 illustrates apparatus adapted to secure the operation of such an increased number as may be desirable and decided upon and shows a ring-armature R, with windings such as are required, associated with a suitable key arrangement Y, to serve as the permutating-transmitter. The entire movable element or rotary-field construction is the same as in the last-described receiving-motor, and the armature occupies the same relative position to the said field, but differs in the construction and arrangement of its coils. The said armature includes a soft-iron ring-core having four equal windings 36, 37, 38, and 39 covering and uniformly distributed over the whole of its surface and connected in two circuits L L² and L³ L⁴, each including alternate and opposite windings. The connections are such that if a current of electricity passes through circuit L L² two opposite consequent poles are produced in the ring at points 1 and 9. With a current in one direction in L L² the polarity at 1 will be north and at 9 will be south, and the centrally-journaled rotary-field magnet $s$ will arrange itself correspondingly. If the direction of the current is reversed, the south polarity will be at 1 and the north at 9. If a current is passed through the circuit L³ L⁴, consequent poles will appear at 5 and 13 in the ring midway between the windings 36 and 38, and the character of their polarity as pointed out above will be according to the direction of the current.

Suppose that a current circulating in circuit L L² only produces north pole at 1 and a current in circuit L³ L⁴ only produces north pole at 5, which is ninety degrees removed from 1. Then if current (still in the same direction) is equally divided between the two circuits and passes simultaneously in both the direction of the currents the four windings acting together will produce a north pole at 3, half-way between 1 and 5, and a south pole at 11, half-way between 9 and 13. If the current in L L² is stronger than in L³ L⁴, the north pole in the ring will occur nearer to 1 than to 5 and the south pole nearer to 9 than to 13, and, vice versa, if the current in L³ L⁴ is stronger than that in L L² the ring-poles will occur toward 5 and 13, respectively, if the current in L L² is twice as strong as the current in L³ L⁴ the north pole will occur at 2 and the south pole at 10, and if the current in L³ L⁴ is twice as strong as in L L² the north pole will occur at 4 and the south pole at 12.

If current is passing in the L L² circuit in the direction from L² to L and in the L³ L⁴ circuit from L³ to L⁴, the north pole of the ring will lie between 5 and 9 in a position determined by the relative strengths of current in the two circuits. If the current is from L² to L in the one circuit and from L⁴ to L³ in the other, the north pole will be within the third quarter of the circle of the ring, and if the current from L to L² and from L⁴ to L³ the north pole will lie within the last quarter of the circle. The quarter of the circle within which the pole appears is determined by the relation of direction of current in the two circuits. The particular location of the pole within the quarter is determined by the ratio of current strengths in the two circuits. In all cases the north and south poles in the ring will be produced at diametrically opposite points. The transmitting apparatus is shown at Y in the upper part of Fig. 15 and consists of a battery H, press keys or button circuit-closers $k$, and resistances Z for introducing upon the lines the prescribed polarity and distribution of current according to the desired location of the poles in the ring. Resistance Z² is wound to produce two units of current, and Z³ and Z⁴ one and one-half units, and Z⁵ one unit. But a few of the sixteen keys required to produce the various consequent poles in the ring are shown, and a description of the operation of two will be given to illustrate the means employed.

Tracing the connections in the diagram by depressing key $k$ the entire current is sent through the circuit L to L², with no current in circuit L³ L⁴, thus producing north pole at 1 and south pole at 9 in the ring. Pressing key $k²$ current is sent on circuit L to L² through resistance Z², giving two units of current, and on circuit $b$ to $b²$, through Z⁵, giving one unit of current, which results in producing a north pole in the ring at 2 and the south pole at 10.

It is evident that keys to the number of sixteen similarly constructed may be severally connected, so as to give the sixteen combinations of current distribution and direction necessary to locate accurately the sixteen corresponding sets of consequent poles in the ring, and that a rotary-field system, substantially similar to that hereinbefore described, will be correspondingly under control and can readily be moved to any required position, and also that with resistances giving different ratios of current, or with a larger number of resistances to admit a greater variety of current strengths, different pole locations and a still greater number of pole locations may be indicated.

In all of the motor-receivers so far described the indication is made upon a dial or upon a series of dials, and may therefore be regarded as selective visible signals.

I will now describe an application of the invention to simultaneously-acting motors upon party-lines for selectively producing audible signals.

Fig. 16 shows twelve stations, with local call-bells designed to be operated selectively by means of a twelve-point dial-movement. The connections through the actuating-coils of the motor-switch are similar to those in Figs. 1 to 7, to which the appliances I now describe are more especially adapted, and extend from the line L, by the conductor $v$, through the first group of magnet-coils to ground $g$, and from the line L², by the conductor $z$, through the second group of magnet-coils to ground. The dial-plate C is of hard rubber or like material, the metallic index-finger $s$, attached to the motor-shaft P², carrying upon its outer end a small contact-wheel $f$, the edge of which bears upon the surface of the plate C and rolls around the said surface as the shaft is revolved. A small metal contact-plate $f²$ is set into the dial-plate within the path of the wheel $f$ and at station No. 1 is placed in a location corresponding with position No. 1 of the index-pointer $s$. The wheel $f$ will roll over the plate $f²$ easily and rest in electrical contact with it when in the position shown in station No. 1. The contact-plate $f^2$ is electrically connected with the conductor L by the wire 60, and the pointer s is connected by wire 61 to the electromagnet 62 and thence to ground. The armature 64, which normally rests upon its back-stop 66, is connected by wire 68 with front contact-stop 65, such connection including local battery 67 and bell 55 in circuit. When, therefore, it is drawn forward and strikes the said stop, the local circuit is closed and the bell rings.

Referring to the first sheet of drawings in connection with Fig. 16, it will be observed that the current which draws the index to the position No. 1 at station No. 1 from any preceding position is a current over line L and that in this position the roller $f$ rests upon the plate $f^2$ at station No. 1. A derived circuit is thus established from the conductor L by the wire 60, through the relay 62, to ground, diverting a portion of the actuating-current from the motor switch-magnets to the relay, closing the relay-armature to its contact 65 and causing the bell to ring. The local closing-relay electromagnet 62 is of comparatively high resistance and sensitive adjustment, so that only a small portion of current is diverted. At each of the other stations the contact-plate $f^2$ is located at a point corresponding with the position of the pointer s for the particular phase of the station. At the six stations which come to their operative positions by means of current upon line L— to wit, stations 1, 3, 5, 7, 9, and 11—the electrical connection is made from the contact-plate $f^2$ to the conductor v and line L in order to shunt a portion of the current from line L to the relay 62. At the alternate stations 2, 4, 6, 8, 10, and 12, which come to operative position by means of current upon line $L^2$, the electrical connection is made from contact-plate $f^2$ to conductor z and line $L^2$. The bells at intermediate stations, whose contacts have to be passed over in order to bring stations beyond to their operative signals, will not in this system give false signals, for it will be observed that between each two consecutive current phases there is an interval of no current. Moreover, the transmitter phases of current, by means of which the pointers s are propelled, have in practice a measurable lead in advance of the movement of the said pointers, so that any intermediate phase of current between any starting-point and any position of rest has ceased before the contact-roller $f$ has touched the plate $f^2$ at the corresponding intermediate station. Therefore, while for each progressive step the pointer stays by inductive attraction in the position to which it has been advanced, since no current during such stay is traversing the line none can pass through the branch 60 to operate the relay 62. Obviously no station-bell will be rung until the desired one is reached, when the current impulse last transmitted can be prolonged to give the signal.

In practice also I prefer to make the relay-magnet 62 and its action upon the local circuit sluggish as compared with the duration of the time of contact occupied by the roller $f$ in passing over the plate $f^2$ of any intermediate station, and this further insures against false signals. Employing the progressively-moving motor and its associated transmitter, I thus have a complete system of selective party-line audible signals.

Fig. 17 shows one way in which a selectively-operated six-call system may be associated with the special form of motor-switch shown in Figs. 9, 10, 11, 12, and 13. In this system the rotary-field magnet does not make a complete revolution, but has a limited movement between a back-stop 58 and a front contact 65, the polarity and position of the said magnet being such that the slight movement it requires to bring it into engagement with the front or contact stop and to close the local circuit and ring the bell at any given station is imparted only when the proper poles are established in the ring at that station, in a manner hereinbefore set forth. The structure of the permanent magnet and field poles N S of the moving part may be the same as in the figures referred to, but I have shown the ring-armature as having but two polar faces 45 46. The poles N S, movable with the shaft $P^2$, are held slightly displaced from exact opposition to the polar faces 45 by the spring $s^2$ against the stop 58 and are moved forward to a line uniting the center of the said polar faces when the latter are properly excited. The earth at $g$ is represented as taking the place of one of the three conductors of Fig. 8, and the several ring-armatures at the several stations have their respective polar faces placed differently, the different positions of the several rings being each sixty degrees in advance of some and behind some other ring. If current is transmitted over the lines having such direction as is outward over conductor L and back over $L^2$ and the earth, consequent poles of full strength are created by its passage through the coils m right and left at 45 and 46 in the armatures of stations 1 and 4 only, and the direction of windings is such that at these stations a north pole is formed at 45 and a south pole at 46. At station No. 1 the mutual attractions between the armature-poles 45 and 46 and the field-poles N and S will draw the latter into a direct line with 45 and 46 and close the local alarm-circuit, ringing the bell. At station 4 the north pole at 45 and the south pole at 46 developed in the ring exert a repellent influence upon the field-poles, which are mounted or placed reversely to those of station No. 1, so that the field-magnet does not move and the local circuit remains open. At stations No. 2 and No. 5 the current over line L, which closes the local circuit at No. 1 and operates the call, produces polarities at 45 and 46 of the rings, but of minor value and not sufficient to overcome the pull of the spring $s^2$. At stations No. 3 and No. 6 the same current produces little or possibly no polarity in the rings, so that the bells there also remain unoperated. Hence the first current of the combination illustrated by Fig. 8 will ring the bell of the first station only, and a current traversing the same route but in reverse direction will in the same way operate the bell at station 4 only. In a similar manner the remaining four current combinations produced by operating keys $k^2$, $k^3$, $k^5$, and $k^6$ of Fig. 8 will each ring the bell of its appropriate or corresponding station and of no other, and thus each station is furnished with a selective signal adapted to be operated from the main station to the exclusion of all others on the same circuit.

I do not regard it as being necessary to indicate the application of the described extensions or amplifications also of my rotary motor-switch to selective signaling, since the principles underlying them are in no wise different from those of the simpler forms.

I claim—

1. The combination in a signaling-circuit, of a motor receiving instrument comprising a fixed system of armature-coils surrounding a core or series of cores, and a permanent rotary-field magnet mounted within the space surrounded by said cores, and of two or more circuit-conductors connecting said coils, the number of circuits being less than the number of coils, with an electric-current generator and a selective-signal and current-controlling transmitter, comprising means for creating different relations between the ends of said conductors and the poles of said generator, and for combining any two of said conductors into a circuit and sending currents of either direction through said circuit, thereby establishing magnet-poles at desired points on said armature-core, substantially as described.

2. An electromagnetic motor comprising a fixed armature composed of a ring-core of iron, a plurality of exciting-helices wound thereover, and formed into a closed circuit with each other, a series of polar faces symmetrically arranged around the said ring-core, and branch conductors extending outward from the closed-coil circuit or main-circuit connections, in combination with a permanently-polarized rotary-field system adapted to move between different points of said armature, and consisting of a permanent inducing-magnet, a rotary shaft journaled or hung to move freely in the center of the armature-ring, and pole-pieces carried by the said shaft, and mounted in the space between the poles of said polarizing-magnet to receive a constant magnetization therefrom; substantially as specified.

3. The combination in a signaling-circuit, of a motor signal-receiver comprising a fixed armature system having an iron ring-core, a continuous winding therefor and a plurality of polar surfaces adapted to constitute selectively-placed consequent poles, and a movable-field system having permanently-magnetized poles, suspended centrally within the ring and adapted to revolve, and to set itself in line with any of the said selectively-established poles; with a source of current; main-circuit conductors extending therefrom to connections with the said armature-windings at points dividing the same into substantially equal parts; and a circuit and current controlling transmitter placed between the poles of said source and the terminals of said conductors, and consisting of a plurality of keys controlling a like number of different combinations of said poles and terminals, and different combinations of current; whereby the armature-poles of said motor-receiver may be selectively established in any predetermined polar surfaces, and the field caused to move into a corresponding predetermined position, according to the particular key operated.

4. The combination in a signaling-circuit, of a motor signal-receiver consisting of a fixed ring-armature with closed-circuit coils associated with the main circuit, and a permanently-magnetized rotary field arranged to revolve freely within the armature-ring; a call-signal device actuated by said rotary field when moved to a definite position in the said ring; a generator of current; main conductors for the said circuit extending between said generator and said motor-receiver; and a circuit and current controlling transmitter consisting of a series of keys each controlling a separate combination of the conductor and generator terminals, and each organized to transmit to the armature-coils of said motor, a definite current combination, adapted to rotate the field system of said motor to a particular position differing for each key within the ring thereof; whereby the signal controlled by said field system may be selectively operated.

5. A rotary motor-selector, consisting of a number of coils in a closed circuit with branches therefrom for connection with the main-circuit conductors; an iron ring-core surrounded by such coils and having inwardly-projecting pole-pieces; a rotary-field magnet journaled or hung in the center of the coils and permanently polarized by a permanent inducing-magnet; an automatic brake or damper to check the oscillations of the said field-magnet mounted on the shaft thereof; and a means for operating an indicator or an alarm, also mounted upon said shaft; as described herein.

6. In a signaling-circuit, the combination of a source of electrical current; and a multiple-circuit controller consisting of a number of keys or switches each adapted to introduce in the circuit a prescribed direction and distribution of current from said source; with a series of motor signal-receivers connected in the main circuit, each consisting of a plurality of coils in a closed circuit encircling an iron ring-core having pole-pieces, and holding such relation to the main circuit that definite and different predetermined polarities may be established in the said pole-pieces by each of said keys; and a polarized field-magnet centrally placed between the coils in inductive relation thereto, and having a limited rotary movement differing in position for each motor, the said field-magnet being adapted when operated to actuate an indicator or an alarm.

7. In a selective call-circuit, a source of electricity, a multiple-circuit controller, and a plurality of rotary motor selectors or receivers; the controller consisting of a number of keys or switches each adapted to introduce in the circuit a prescribed polarity and distribution of current; each receiver comprising a fixed element consisting of a plurality of electromagnetic coils in series, in such relation to the main circuit that definite and different predetermined polarities may be selectively established in the cores of the coils, and a movable element consisting of permanent-magnet poles hung in the center of the group of coils; a circuit-closing device actuated by said movable part; and a local circuit controlled thereby and including a battery and a bell; whereby upon the manipulation of any one of said keys or switches the corresponding circuit-closing device and no other, operates to close its own local circuit, and operate the bell included therein.

8. The combination in a signaling-circuit, of a battery; and a circuit-controller consisting of a plurality of keys adapted to introduce in the circuit prescribed polarities and distribution of the current supplied by said battery; with a plurality of motor signal-receivers, each consisting of a plurality of coils in a closed circuit upon an iron ring in such relation to the main circuit, that upon the manipulation of any key two definite predetermined consequent poles of opposite polarity differing for each key will be selectively established in the said ring; and a rotary polarized magnet in inductive relation with said ring adapted to arrange itself in line between said established poles; as and for the purposes set forth.

9. The combination in a signaling-circuit, of a battery; and a circuit-controller consisting of a plurality of keys adapted to transmit currents varying in direction and distribution; with a plurality of motor signal-receivers one for each key, each consisting of a plurality of coils in a closed circuit, upon an iron ring, with branches extending from between the said coils to the main circuit, and a rotary polarized field magnet in inductive relation with the said coils, adapted to operate an indicator or an alarm; whereby upon the manipulation of any key two definite predetermined consequent poles of opposite polarity will be selectively established in the said rings of the said motors and an indication or an alarm given by the one corresponding to said key, as set forth.

In testimony whereof I have signed my name to this specification, in the presence of two subscribing witnesses, this 17th day of February, 1897.

JOHN A. BARRETT.

Witnesses:
H. H. BRIGHAM,
EDWARD W. BELL.